United States Patent [19]
Tibbals, Jr.

[11] 3,807,440
[45] Apr. 30, 1974

[54] VALVE

[76] Inventor: Edward Camp Tibbals, Jr., 240 Brook Pl., Boulder, Colo. 80302

[22] Filed: June 15, 1972

[21] Appl. No.: 262,991

[52] U.S. Cl. .......................... 137/493.2, 137/493.8
[51] Int. Cl. ........................................... F16k 17/00
[58] Field of Search ..... 137/493.1, 493, 508, 493.7, 137/493.8, 513.3, 513.7, 525, 511, 493.2; 251/368

[56] References Cited
UNITED STATES PATENTS
| | | | |
|---|---|---|---|
| 2,501,121 | 3/1950 | Caserta | 137/493.8 |
| 2,931,378 | 4/1960 | Davies | 137/493 X |

Primary Examiner—Robert G. Nilson
Assistant Examiner—Robert J. Miller

[57] ABSTRACT

A valve including a pair of body sections coupled together in sealing engagement to make a valve housing suitable for installation in a fluid flow line. One body section has a main valve head assembly arranged to cooperate with a valve seat formed in the other body section. Diaphragm members form integral structural components of each body section and operate as Belleville springs in moving the main valve head out of contact with the valve seat, to allow liquid flow through the seat, when a pressure sufficient to flex the diaphragm members exists within the valve. A check valve within the main valve housing allows liquid trapped above the main valve to drain therethrough when line pressure is relieved. Cooperating limit flanges are formed on the body sections and are arranged to be aligned when the two body sections are coupled in sealed relationship. The aligned flanges hold the body sections together after a predetermined minimum liquid pressure in the housing flexes the diaphragms apart to open the main valve. The diaphragms remain in their flexed apart positions and the valve remains open until the pressure in the housing drops below the minimum level, at which time the valve snaps closed.

12 Claims, 3 Drawing Figures

PATENTED APR 30 1974 3,807,440

VALVE

BRIEF DESCRIPTION OF THE INVENTION

1. Field of the Invention

This invention relates to valves constructed to allow flow therethrough only when a minimum fluid pressure is present therein.

2. Prior Art

Valves maintaining positive closure against liquid flow below a minimum pressure have long been known and used. Such valves have generally used conventional, mating valve head and seat arrangements and a pressure responsive, spring biased, member such as a diaphragm or a piston. In these known structures the pressure responsive member is formed separately from supporting housing structures, although it is thereafter generally attached to such housing structures. Once inlet pressure is sufficient to overcome the bias of the spring the valve head moves linearly with respect to the seat and flow is permitted. A fluttering action of the valve head may result and positive full opening and closing at desired pressures are difficult to achieve. In addition, it has always been possible to provide a reverse flow check valve in the known valves of this type to allow for relief of downstream pressure, since the biasing springs used may obstruct positioning of the reverse flow check valve. Such a reverse flow check valve is desirable for many uses, such as, for example, in sprinkler irrigation systems where it is desired that upstanding risers be drained after main flow pressure has been turned off and before the lateral lines are moved or to prevent freezing of water in the sprinkler heads.

The present invention seeks to remedy these and other deficiencies by providing a valve that is reliable and consistent in its operations and that is inexpensively formed with a pair of coupled body sections, each having an integral, non-linear pressure responsive spring member forming a structural part of the body section and arranged out of the flow path such that a reverse flow check valve can be used, if desired.

SUMMARY OF THE INVENTION

The valve of the present invention provides a valve head and a valve seat, each moved by a pressure responsive, non-linear diaphragm spring member such that when a minimum pressure is sensed, the head and seat are separated and when the pressure is below the minimum the valve head and seat move together to prevent main flow through the valve.

It is a principal object of the present invention to provide a valve that will positively fully open when a minimum liquid pressure is present upstream of the valve and that will fully close rapidly when the required minimum upstream pressure is not present.

Another object is to provide a valve that is easily and economically manufactured in two sections, and includes, if desired, a reverse flow check valve, all of which are easily assembled together with a minimum of labor.

Still another object is to provide a valve that will allow gravity drainage centrally through the valve of liquid trapped above and downstream of the valve.

Principal features of the present invention include a housing formed by conventional casting or molding methods in two body sections of lightweight, inexpensive, and somewhat flexible materials. One body section has a number of spaced lugs that project radially outwardly from around an outer edge thereof. The other body section has spaced openings formed through an inturned flange that extends from around its outer edge. The lugs of the one body section are arranged to pass through the openings in the other body section, and, when the body sections are rotated with respect to one another, the lugs lock beneath the unbroken portions of the flange of the other body section to securely couple the body sections together. A fluid compressed ring gasket, mounted between the body section prevents leakage from the housing.

A diaphragm member is formed as an integral structural component of each body section to operate as a Belleville spring. A valve head is arranged to move with the diaphragm member in one body section, and a valve seat is arranged to move with the diaphragm member in the other body section. The valve head and seat are positioned centrally of their diaphragm members and are aligned when the body sections are coupled together. Limit flanges on the valve head and seat are aligned when the body sections are coupled together and are spaced apart when the diaphragm springs are relaxed. As downstream pressure in the valve builds up and the valve head and seat separate the limit flanges move together thereby preventing further diaphragm movement and preventing consequent diaphragm rupture and separation of the body sections in the event of an excess pressure build up.

A check valve may be provided within the valve to allow liquid trapped above the valve to reversely drain therethrough. The check valve is arranged to pass such trapped liquid only when liquid pressure is not present within the valve and flow upstream of the valve has been cut off.

Additional objects and features of the invention will become apparent from the following detailed description and drawings disclosing what is presently contemplated as being the best mode of the invention.

THE DRAWINGS

FIG. 1 is an assembled, side elevation view of the valve of the invention with part of the housing, partially broken away to show the interior construction and the interaction of the parts therein;

FIG. 2, a perspective view looking into the upper valve body section; and

FIG. 3, a perspective view looking into the lower valve body section.

DETAILED DESCRIPTION

Figure 1:
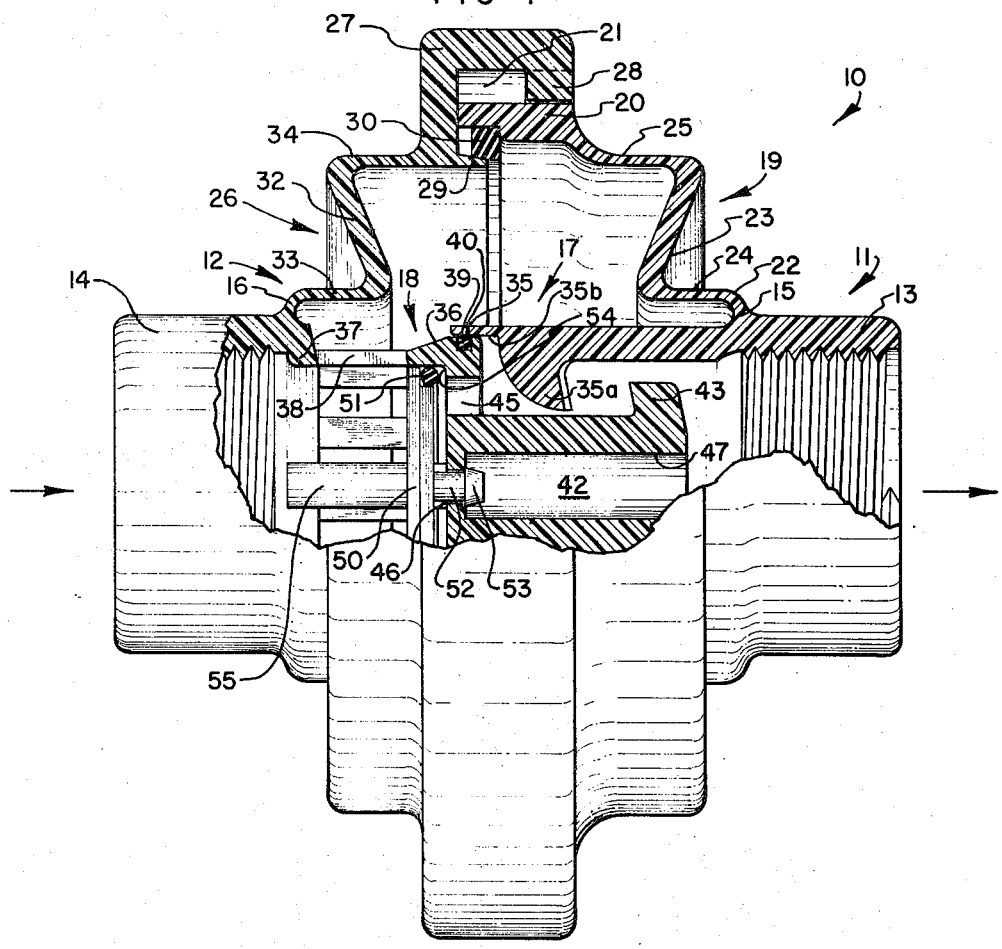
Figure 2:
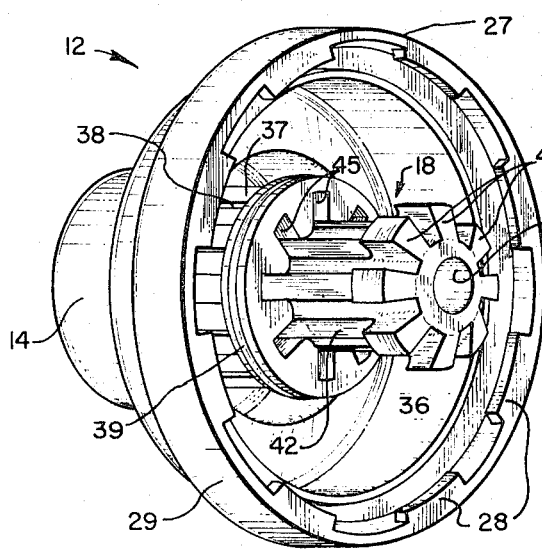
Figure 3:
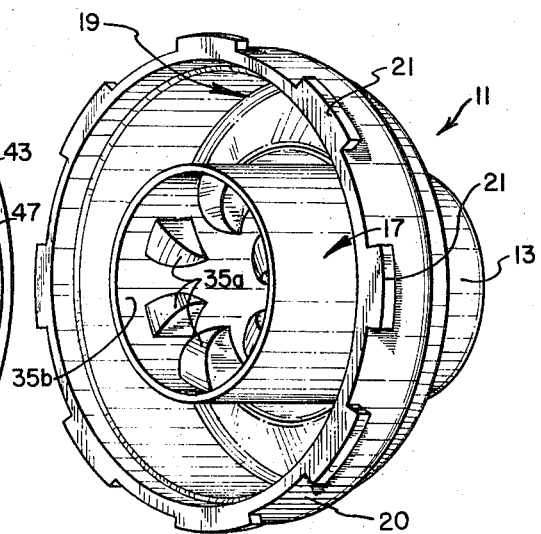

Referring now to the drawings:

In the illustrated preferred embodiment, the valve, shown generally at 10, includes a housing made up of body sections 11 and 12. Body section 11 has an interiorly threaded sleeve coupling 13 and body secton 12 has a similar sleeve coupling 14. The sleeve couplings respectively project outward from shoulders 15 and 16 to be respectively connected to a downstream conduit, not shown, and an upstream feed pipe, not shown. A valve seat, shown generally at 17 projects from the sleeve coupling 13 and a valve head assembly, shown generally at 18, projects from the sleeve coupling 14. The valve seat and head assemblies will be hereinafter described in further detail.

A diaphragm 19 interconnects the outside of sleeve coupling 13 and a ring shaped outer wall 20 of the body section 11. Lugs 21 are spaced around and project from an outer wall 20, for use in coupling the body section 11 to the body section 12, as will be hereinafter described.

Diaphragm 19 forms a portion of the outer wall of body section 11 and is shaped to deform when pressure is applied to an inner face thereof. Accordingly, diaphragm 19 is connected by a curved portion 22 to the outside of sleeve coupling 13, and has a depressed central portion 23 interconnecting an inner leg 24 and an outer leg 25. Inner leg 24 is connected to the curved shoulder portion 22 and outer leg 25 is connected to outer wall 20. The central portion 23 of the diaphragm and its connections with inner and outer legs 24 and 25, respectively, are preferably made of substantially thicker material than are the inner and outer legs. Thus, the central portion, which acts as a center link of a toggle when the diaphragm is exposed to pressures above a predetermined value, as will be further explained, and that yields during valve operation, will not be likely to rupture.

Another diaphragm 26, similar in construction to diaphragm 19, is formed integral with and interconnects the sleeve coupling 14 of body section 12 and a ring shaped outer wall 27 having an inturned flange 28 that is intermittently broken away through its length to allow insertion of lugs 21. Once the lugs 21 have been inserted between intermittent portions of flange 28, the body sections 11 and 12 can be rotated with respect to one another until the lugs 21 are beneath a solid portion of flange 28. The body sections 11 and 12 are thus locked securely together. Outer wall 27 preferably has an upstanding ring 29 thereon that is spaced from the outer wall 20 of body section 11 and a circular seal 30, of resilient material, preferably having a rectangular cross-sectional configuration, is positioned between the ring 29 and outer wall 20 where it is positioned upon locking of lugs 21 and where it will provide a seal against leakage from the interior of the housing through the connections between the body sections 11 and 12. Fluid pressure in the housing acts against the exposed portions of seal 30 to wedge the ring tightly between the ring 29 and outer wall 20, thereby making the seal even more leak proof.

Diaphragm 26, like the diaphragm 19, previously disclosed, is connected through the curved shoulder 16 to the sleeve coupling 14 and has a thickened central portion 32 interconnecting an inner leg 33 and an outer leg 34. Inner leg 33 is connected to curved shoulder 16 and outer leg 34 is connected to the outer wall 27.

Valve seat assembly 17 includes an extension 35 having inwardly projecting, spaced, limit flanges 35a intermediate its length. The inner wall of the extension 35 serves as a valve seat 35b.

Valve head assembly 18 includes a generally disc shaped valve head 36 supported on a cylindrical support structure 37 having elongate ports 38 therethrough. Support structure 37 is fixed to and projects from the sleeve coupling 14. An O-ring seal 39 is provided in a groove 40 surrounding the periphery of valve head 36 such that the O-ring engages a valve seat 35b, and provides a tight seal between the valve seat 35b and the valve head 36.

In operation, the valve head 36 is normally positioned within the valve seat 35b and O-ring 39 normally engages the wall making up the valve seat 35b. If, however, sufficient pressure results from the liquid entering through sleeve coupling 14 and passing through ports 38 to act on the diaphragms 19 and 26, the diaphragms are forced apart and the valve head moves out of valve seat 35b to provide a passageway from the sleeve coupling 14, between the valve head and valve seat, and through sleeve coupling 13. A cylindrical projection 42 extends centrally from valve head 36 and has limit flanges 43 projecting outwardly from the end thereof and spaced from the limit flanges 35a of valve seat assembly 17 when the body sections 11 and 12 are coupled together. As the diaphragms 19 and 26 move away from one another the limit flanges 35a and 43 are moved towards one another. Should sufficient pressure develop within the housing the limit flanges will come into engagement to prevent further separation of the diaphragms and of the valve seat and valve head. This prevents diaphragm rupture and separation of the body sections under extreme pressure.

If desired, a check valve can be provided to allow for drainage of liquid in the sleeve coupling 13 when pressure in sleeve coupling 14 has been sufficiently reduced. For this purpose, small ports 45 are provided around the projection 42 and spaced through valve head 36. Another passage 46 is provided through the valve head 36, centrally thereof, and connects into a passageway 47 within the projection 42. A valve head 50 having a peripheral O-ring 51 therearound is positioned within the valve head 36 and is held in place by a stem 52 that extends through passage 46 and a deformable, enlarged head 53 on the end of stem 52. The head allows the check valve to be snapped into place and then prevents withdrawal of the valve through the passage 46. Stem 52 is of smaller diameter than the passage 46 and moves freely within the passage, thereby allowing the O-ring 51 to engage and move away from a valve seat 54 formed by the undersurface of valve head 36 outside of the ring of ports 45. A shaft 55 fixed to the valve head 50 is used to facilitate insertion of the check valve into the valve head assembly.

It should be apparent that when the valve of the present invention is to be used, the fluid distribution system which it is used must allow for line expansion as the diaphragms 19 and 26 move with respect to one another. Thus, the valve has been found ideally suitable for sprinkler irrigation systems and it is desirably positioned beneath a riser connected to a main or lateral line and having a sprinkler positioned thereabove. In this operation, the valve serves to prevent flow through a sprinkler until such time as a pressure above a desired line pressure, that has been predetermined by the design of the diaphragm springs, has been achieved. At this time, the sprinkler almost immediately begins essentially full operation. The sprinkling operation is continued until such time as the line pressure is cut off or drastically reduced, and when the line pressure has been reduced to a predetermined level the valve almost instantaneously cuts off, thereby preventing continued drip type flow that does nothing but maintain the area closely surrounding the sprinkler in a muddy condition to thereby increase the difficulties of moving the sprinkler line. Once the pressure in the main line has been sufficiently reduced, the check valve drops and reverse flow from the sleeve coupling 13 and riser and sprinkler thereabove is permitted through passages 46 and between the O-ring 51 and valve seat 54, around valve head 50, and back into the sleeve coupling 14 and the main line. The riser is thus drained and no water is retained therein to be frozen. Naturally, in such a system, a means will normally be provided to drain the main line at one end thereof.

The body sections 11 and 12 are each preferably formed as a single unit, of a suitable plastic, such that the desired non-linear deflection charactertistics of the diaphragms 19 and 26 can be obtained. The deflection characteristics are the same as are disclosed for the similarly structured diaphragms described in my copending application for patent, Ser. No. 262,992, entitled "Pressure Regulator." As described in the copending application, the diaphragms act as Belleville springs, with maximum deflection at the valve component carrying central portions thereof and with very little deflection to open the main valve until a predetermined operating pressure develops at the valve inlet. Thereafter, minimal further pressure increase will fully open the main valve. Similarly, the main valve will be held open until the inlet pressure is reduced to the operating pressure and thereafter will close in response to minimal further pressure reduction. The diaphragms can be reinforced and stops can be used to limit their deformation, all as disclosed in my aforesaid copending application.

After the initial costs have been met, the costs of production of the body sections 11 and 12 can be maintained quite low and a very inexpensive valve can be produced. The check valve, comprising head 50, stem 52 and shaft 55 can also be formed from a suitable plastic and is readily injection molded in one piece.

Although a preferred form of my invention has been herein disclosed, it is to be understood that the present disclosure is by way of example and that variations are possible without departing from the scope of the hereinafter claimed subject matter, which subject matter I regard as my invention.

I claim:

1. A valve comprising
a first housing section having an inlet opening thereinto;
a second housing section having a discharge opening therefrom;
means for coupling said housing sections in sealed relationship;
a valve seat formed in one of said housing sections, between said inlet and discharge openings and connected to a wall of said housing section;
a valve head carried by a wall of the other housing section and arranged to act against said valve seat; and
diaphragm means forming part of an outer wall of each of said housing sections, whereby sufficient pressure within the housing will act on the diaphragm to provide relative movement between the valve head and valve seat whereby they are separated and flow is permitted through the said housing from the inlet opening, through the valve seat to the discharge opening.

2. A valve comprising
a first housing section having an inlet opening thereinto;
a second housing section having a discharge opening therefrom;
means for coupling said housing sections in sealed relationship;
a valve seat formed in one of said housing sections, between said inlet and discharge openings and connected to a wall of said housing section;
a valve head carried by a wall of the other housing section and arranged to act against said valve seat;

diaphragm means forming part of a said wall of at least one of said housing sections, whereby sufficient pressure within the housing will act on the diaphragm to provide relative movement between the valve head and valve seat whereby they are separated and flow is permitted through the said housing from the inlet opening, through the valve seat to the discharge opening; and
means carried by the housing sections for limiting relative separation of the valve head and valve seat, thereby preventing rupturing of the diaphragm means.

3. A valve comprising
a first housing section having an inlet opening thereinto;
a second housing section having a discharge opening therefrom;
means for coupling said housing sections in sealed relationship;
a valve seat formed in one of said housing sections, between said inlet and discharge openings and connected to a wall of said housing section;
a valve head carried by a wall of the other housing section and arranged to act against said valve seat; and
diaphragm means forming part of a said wall of at least one of said housing sections, whereby sufficient pressure within the housing will act on the diaphragm to provide relative movement between the valve head and valve seat whereby they are separated and flow is permitted through the said housing from the inlet opening, through the valve seat to the discharge opening said diaphragm means surrounding the opening through said housing section to act as a Belleville spring.

4. A valve comprising
a first housing section having an inlet opening thereinto;
a second housing section having a discharge opening therefrom;
means for coupling said housing section in sealed relationship;
a valve seat formed in one of said housing sections, between said inlet and discharge openings and connected to a wall of said housing section;
a valve head carried by a wall of the other housing section and arranged to act against said valve seat;
diaphragm means forming part of a said wall of at least one of said housing sections, whereby sufficient pressure within the housing will act on the diaphragm to provide relative movement between the valve head and valve seat whereby they are separated and flow is permited through the said housing from the inlet opening, through the valve seat to the discharge opening;
passage means through the valve head;
a check valve formed on said head around the said passage means; and
a gravity opened check valve head arranged to seat on the check valve seat when pressure is applied to the interior of the housing through the inlet opening thereinto and to fall away from said seat when pressure to said inlet opening is cut off.

5. A valve comprising
a first housing section having an inlet opening thereinto;
a second housing section having a discharge opening therefrom;
means for coupling said housing sections in sealed relationship;
a valve seat formed in one of said housing sections, between said inlet and discharge openings and connected to a wall of said housing section;
a valve head carried by a wall of the other housing section and arranged to act against said valve seat; and
diaphragm means forming part of a said wall of at least one of said housing sections, whereby sufficient pressure within the housing will act on the diaphragm to provide relative movement between the valve head and valve seat whereby they are separated and flow is permitted through the said housing from the inlet opening, through the valve seat to the discharge opening; and
said first housing and the components carried thereby being formed in one piece from plastic, and said second housing and the components carried thereby being formed in one piece from plastic.

6. A valve comprising:
a first housing section having an inlet opening thereinto;
a second housing section having a discharge opening thereform;
means for coupling said housing sections together;
seal means between said housing sections and arranged to be acted on by fluid pressure within said sections to be wedged between the sections;
a valve head unit carried by one of said housing sections;
a valve seat unit carried by the other of said sections, said valve seat defining a fluid flow path therethrough; and
a Belleville diaphragm carried by one of said housing sections and carrying one of said units, whereby movement of said diaphram moves the unit carried thereby with respect to the other unit.

7. A valve comprising
a first housing section having an inlet opening thereinto;
a second housing section having a discharge opening therefrom;
means for coupling said housing sections together;
seal means between said housing sections and arranged to be acted on by fluid pressure within said sections to be wedged between the sections;
a valve head unit carried by one of said housing sections;
a valve seat unit carried by the other of said sections, said valve seat defining a fluid flow path therethrough; and
each housing section carries a spring that carries one of said unts and wherein each spring is a Belleville diaphragm, said diaphragms forming opposite walls of the valve, whereby a predetermined pressure in the valve, acting on the diaphragms moves them apart and separates the units.

8. A valve is in claim 1 further including
means carried by the housing sections for limiting relative separation by the valve head and valve seat, thereby preventing rupturing of the diaphragm means.

9. A valve as in claim 1, wherein the diaphragm means surrounds the opening of each housing section to act as Belleville springs.

10. A valve as in claim 1, further including
passage means through the valve head;
a check valve seat formed on said head around the said passage means;
a gravity opened check valve head arranged to seat on the check valve seat when pressure is applied to the interior of the housing through the inlet opening thereinto and to fall away from said seat when pressure to said inlet opening is cut off.

11. A valve as in claim 1, wherein the first housing and the components carried thereby are formed in one piece from plastic, and the second housing and the components carried thereby are formed in one piece from plastic.

12. A valve as in claim 7 wherein
each Belleville diaphragm forms a structural wall of its assiated housing section.

* * * * *